United States Patent [19]

Sano et al.

[11] Patent Number: 5,815,600
[45] Date of Patent: Sep. 29, 1998

[54] IMAGE DATA SIGNAL COMPRESSION/ TRANSMISSION METHOD AND IMAGE DATA SIGNAL COMPRESSION/ TRANSMISSION SYSTEM

[75] Inventors: Seiichi Sano, Kodaira; Shuji Usui, Hachioji; Atsushi Miyashita, Tokorozawa; Yuuichi Oonami, Iruma; Takayuki Tanaka; Ryu Watanabe, both of Tokyo, all of Japan

[73] Assignee: Hitachi Denshi Kabushiki Kaisha, Tokyo, Japan

[21] Appl. No.: 517,585

[22] Filed: Aug. 22, 1995

[30] Foreign Application Priority Data

Aug. 25, 1994 [JP] Japan ................................... 6-200349

[51] Int. Cl.$^6$ ....................................................... G06K 9/36
[52] U.S. Cl. ............................................................ 382/232
[58] Field of Search ................................... 382/232, 234, 382/235, 236, 238, 239, 248; 348/17, 390, 398, 409, 410, 419; 358/430, 432; 341/106

[56] References Cited

U.S. PATENT DOCUMENTS

| | | | |
|---|---|---|---|
| 4,369,464 | 1/1983 | Temime | 348/410 |
| 4,580,162 | 4/1986 | Mori | 358/430 |
| 4,656,500 | 4/1987 | Mori | 358/430 |
| 4,893,123 | 1/1990 | Boisson | 348/419 |
| 5,212,742 | 5/1993 | Normice et al. | 382/234 |
| 5,289,289 | 2/1994 | Nagasaki | 358/432 |
| 5,367,331 | 11/1994 | Secher et al. | 348/17 |
| 5,488,367 | 1/1996 | Kitamura | 341/106 |
| 5,600,374 | 2/1997 | Shikakura | 348/398 |
| 5,627,581 | 5/1997 | Kondo | 348/390 |

FOREIGN PATENT DOCUMENTS

| | | |
|---|---|---|
| 0 499 088 A2 | 8/1992 | European Pat. Off. . |
| 0 506 294 A2 | 9/1992 | European Pat. Off. . |
| 6-338805 | 12/1994 | Japan . |

OTHER PUBLICATIONS

"HDTV Decoder for Digital Video Signal and Image Compression" (abstract), Jeng et al, Ind. Technology Res. Inst., Database WPI, Section EI, Week 94/05, Derwent Publications Ltd., London, GB, 21 Nov. 1993.

"An Experimental Home–Use Digital VCR with Three–Dimensional DCT and Superimposed Error Correction Coding", K. Onishi et al, IEEE Transactions on Consumer Electronics, vol. 37, No. 3, Aug. 1991, pp. 252–259.

"Predictive Coder for Digital VCR Trick Play", Park et al, IEEE 1993 International Conference on Consumer Electronics, Jun. 1993, Rosemont, IL, US, pp. 28–29.

Trans. of The Institute of Television Engineers of Japan, vol. 47, No. 4, pp. 471–472 (1993).

Recommendation H.26x, ISO/IEC xxxx, Jul. 16, 1993, p. 93.

Primary Examiner—Jose L. Couso
Attorney, Agent, or Firm—Antonelli, Terry, Stout & Kraus, LLP

[57] ABSTRACT

An image signal compression transmission system for transmitting and receiving a compressed image signal, having a transmitter section which entropy codes digitized image data for transmission, a transmission channel through which entropy-coded codes sent from said transmitter section are transmitted, and a receiver section which decodes said entropy-coded codes received from said transmission channel and derives an original digital image signal. In the transmitter section, digital image data is entropy coded. The entropy-coded codes are transmitted to the receiver section through the transmission channel. In the receiver section, the received codes are entropy code decoded at a decoding speed corresponding to a transmission rate on the transmission channel. Coefficient codes derived by the decoding are stored into a memory at the same speed as the decoding speed. Then, the coefficient codes are read from the memory at a speed different from the decoding speed, but at the same speed as a signal processing rate in a signal processing system subsequent to the memory.

5 Claims, 5 Drawing Sheets

IMAGE DATA SIGNAL COMPRESSION/TRANSMISSION METHOD AND IMAGE DATA SIGNAL COMPRESSION/TRANSMISSION SYSTEM

BACKGROUND OF THE INVENTION

The present invention relates to techniques for transmitting compressed digital image data signals and reproducing original digital image data from the transmitted compressed image data signals. Particularly, the present invention relates to an image data signal compression/transmission system and an image data signal compression/transmission method, wherein a digital image data signal may be entropy coded to reduce its data amount on the transmission side, and the entropy-coded data signal may be decoded to a reproduced image data signal, on the reception side, which is maintained substantially in a real time relationship with the image data signal on the transmission side, and a reception method and a receiver suitable for image data signals used in a transmission system as mentioned above.

Referring first to FIG. 2, a transmitter in an image data signal compression/transmission system is illustrated in a block diagram form.

In FIG. 2, the transmitter is composed of a scan converter 1; a hybrid coding unit 2; an entropy coding unit 4; and a transmission buffer memory 6 (hereinafter referred to as the transmission buffer). A transmission channel 8 is provided for transmitting signals sent from the transmitter section therethrough.

Image data, which is a digitized image data signal, is inputted to the scan converter 1 in which the image data is subjected to scan conversion and then outputted to the hybrid coding unit 2. The scan conversion performed in the scan converter 1 converts the image data in a scan format similar to that of ordinary television signals to data in a different scan format which facilitates the coding processing in the hybrid coding unit 2.

The scan-converted image data is coded by the hybrid coding unit 2 to coefficient codes which are then outputted to the entropy coding unit 4. An example of a normal configuration for moving image data signal compression encoding is the one defined by ITU-R Recommendation (former CCIR recommendation) 723. In this description the hybrid coding scheme is assumed to be a combination of a transform coding and a predictive coding scheme in the configuration indicated by ITU-R Recommendation 723.

The hybrid coding will be briefly described below. There are numerous kinds of image coding algorithms for compressing image information. Examples of such algorithms include predictive coding which utilizes intra-frame correlation and inter-frame correlation, transform coding such as DCT (Discrete Cosine Transform), vector quantization, and so on. The hybrid coding employs a combination of two or more of these compression algorithms so as to reduce spatial redundancy or temporal redundancy of information to be transmitted. In a compression process of image signals, the compression ratio can be further increased by combining the hybrid coding with entropy coding, later described. The entropy coding assigns a code of a shorter data length to a highly frequent signal and a code of a longer data length to a less frequent signal and outputs the assigned code instead of the signal, thereby reducing, as a whole, an average amount of codes generated by the coding.

The entropy coding is one of variable length coding schemes, and includes Huffman coding, arithmetic coding, and so on. In the entropy coding, the shorter length code is assigned to the image data having higher probability of existence. For example, the image data is entropy-coded according to the variable length code tables as shown in the following TABLE 1 according to "Recommendation H.26x, ISO/IEC xxxxx", Jul. 16, 1993, page 93.

TABLE 1

Variable length codes for macroblock_address_increment

| macroblock_address_increment VLC code | increment value | macroblock_address_increment VLC code | increment value |
|---|---|---|---|
| 1 | 1 | 0000 0101 10 | 17 |
| 011 | 2 | 0000 0101 01 | 18 |
| 010 | 3 | 0000 0101 00 | 19 |
| 0011 | 4 | 0000 0100 11 | 20 |
| 0010 | 5 | 0000 0100 10 | 21 |
| 0001 1 | 6 | 0000 0100 011 | 22 |
| 0001 0 | 7 | 0000 0100 010 | 23 |
| 0000 111 | 8 | 0000 0100 001 | 24 |
| 0000 110 | 9 | 0000 0100 000 | 25 |
| 0000 1011 | 10 | 0000 0011 111 | 26 |
| 0000 1010 | 11 | 0000 0011 110 | 27 |
| 0000 1001 | 12 | 0000 0011 101 | 28 |
| 0000 1000 | 13 | 0000 0011 100 | 29 |
| 0000 0111 | 14 | 0000 0011 011 | 30 |
| 0000 0110 | 15 | 0000 0011 010 | 31 |
| 0000 0101 11 | 16 | 0000 0011 001 | 32 |
| | | 0000 0011 000 | 33 |
| | | 0000 0001 111 | macroblock_stuffing |
| | | 0000 0001 000 | macroblock_escape |

Turning back to FIG. 2, the coefficient codes inputted to the entropy coding unit 4 are subjected to entropy coding (the Huffman coding, for example, is used for this entropy coding), so that entropy-coded codes are outputted to the transmission buffer 6 (which may be a FIFO buffer memory, by way of example).

The codes inputted to the transmission buffer 6 are once stored thereinto and read therefrom to the transmission channel 8 at a timing of the transmission channel 8 which operates asynchronously with a clock timing at which the transmitter section in the image compression/transmission system is operating. Assuming, for example, that the transmission rate of the transmission channel 8 is 1.5 Mbps, a clock frequency for reading codes from the transmission buffer 6 may be 1.5 MHz.

Next, the operation of the entropy coding unit 4 for entropy coding coefficient codes outputted from the hybrid coding unit 2, among respective portions in the image compression/transmission system shown in FIG. 2, will be particularly described in greater detail with reference to FIG. 3.

Coefficient codes outputted from the hybrid coding unit 2 shown in FIG. 2 are orderly arranged as a first coefficient code 81; a second coefficient code 82; a third coefficient code 83; a fourth coefficient code 84; and so on, as a sequence of coefficient codes 80 in FIG. 3. Assuming that an image signal inputted to the image compression/transmission system is, for example, a component image signal as shown in ITU-R Recommendation 601, these coefficient codes are generated in real time at intervals of 13.5 MHz (megahertz) which is equal to a sampling frequency of an image signal.

For facilitating the understanding, a time base 73 is added above the coefficient code sequence 80 in FIG. 3 for indicating the time at which each coefficient code associated with a transmitted image is processed. The coefficient codes are generated at intervals of approximately 74 ns (nanoseconds) which is represented by a period 70 on the time base 73.

Next, the Huffman coding will be described as an example of the entropy coding employed for the entropy coding unit 4 shown in FIG. 2. The Huffman coding, which is a kind of variable length coding scheme, assigns a code of a shorter length (for example, one bit at minimum) to a more frequent coefficient code and assigns a code of a longer length (for example, 20 bits at maximum) to a less frequent coefficient code. In conformity with this definition, in FIG. 3, the coefficient code 81 may be converted to a 4-bit code, while the coefficient code 82 may be converted to a 10-bit code by way of example. Further, the next coefficient code 83 may be a 20-bit code, and the subsequent coefficient code 84 may be a 2-bit code. Assuming that coefficient codes 81 and 82 among coefficient codes 81–84 are converted by utilizing TABLE 1, the coefficient code 81 corresponds to increment value 4 or 5 in TABLE 1 and the converted code thereof is "0011" or "0010" of four bits. Further, coefficient code 82 corresponds to increment values 16–21 of TABLE 1 which are converted to "0000 0101 11", "0000 0101 10", "0000 0101 01", "0000 0101 00", "0000 0100 11" or "0000 0100 10" of ten bits.

Assuming that the respective coefficient codes 81–84 in the coefficient code sequence 80 shown in FIG. 3 are Huffman coded to have respective code lengths applied with the code lengths described in the above example, the total length of the Huffman-coded coefficient code sequence 80 may be represented by a code length sequence 71 in FIG. 3. The entropy coding unit 4 connects such variable length codes in order without any breaks, and outputs a sequence of the connected codes to the transmission buffer 6 shown in FIG. 2.

The variable length codes inputted to and stored into the transmission buffer 6 are represented by a transmission buffer code sequence 72 shown in FIG. 3, with a transmission buffer address axis 74 added, for facilitating the understanding, below the code sequence 72 for representing address locations in which the respective variable codes are stored. The codes stored in the transmission buffer 6 (FIG. 2) are read therefrom at a clock timing corresponding to the transmission rate on the transmission channel 8 so that the time base thereof is converted, and outputted to the transmission channel 8 in the order shown in the transmission buffer code sequence 72.

An example of the configuration of an apparatus for compressively coding image signals using a hybrid coding unit and an entropy coding unit (variable coding unit) based on ITU-R Recommendation 723 is shown, for example, in Transactions of the Institute of Television Engineers of Japan, Vol. 47, No. 4, pp. 471–472 (1993).

SUMMARY OF THE INVENTION

There has not been found, in any published documents, any specific configuration of a decoding apparatus for restoring original image signals by decoding image data coded by the above-mentioned apparatus for compressively coding image signals using a hybrid coding unit and an entropy coding unit (variable coding unit) based on ITU-R Recommendation 723.

It is an object of the present invention to provide image compression/transmission techniques for effectively decoding image data coded by an entropy coding unit to restore an original image signal with a relatively simple configuration.

It is another object of the present invention to provide decoding processing techniques which can entropy code decode at a rate corresponding to a signal transmission rate on any signal transmission channel, and adapt a rate of codes outputted from an entropy code decoding unit to a signal processing rate in a signal processing circuit (for example, a hybrid decoder), such that an image signal can be reproduced on the decoding side (in a receiver section) substantially in a real time relationship with an original image signal on the coding side (in a transmitter section).

According to the image compression/transmission method of the present invention, digital image data is entropy coded in a transmitter section. Entropy-coded codes are transmitted to a receiver section through a transmission channel. The receiver section decodes the received codes at a decoding speed corresponding to a transmission rate on the transmission channel. Coefficient code data derived by the decoding is stored in a memory at the same speed as the decoding speed. Next, coefficient codes are read from the memory at the same speed as a signal processing rate in a signal processing system at a stage subsequent to the memory. Stated another way, the coefficient codes are read from the memory at a speed different from the writing speed at which they have been written thereinto, thereby changing an amount of data processed per unit time before and after the memory, i.e., performing time base conversion.

DESCRIPTION OF THE PREFERRED EMBODIMENTS

Figure 2:
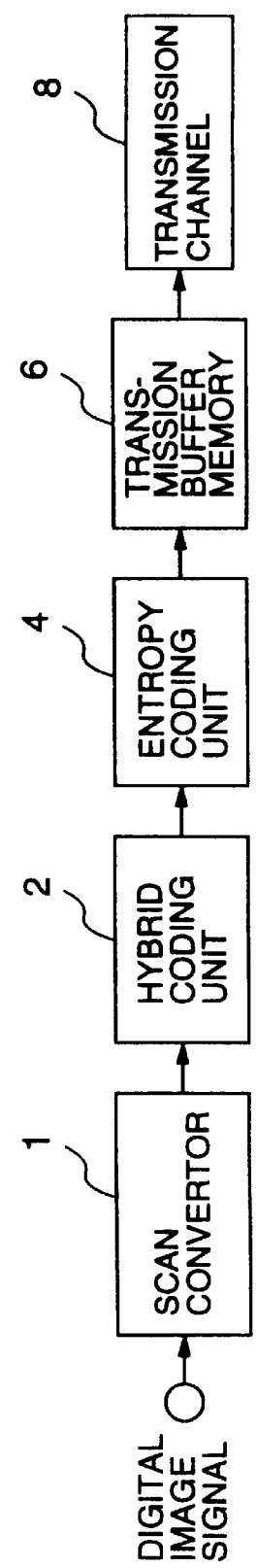
FIG. 2 is a block diagram showing a conventional transmitter section of an image transmission system including a hybrid coding unit and an entropy coding unit.
Figure 5:
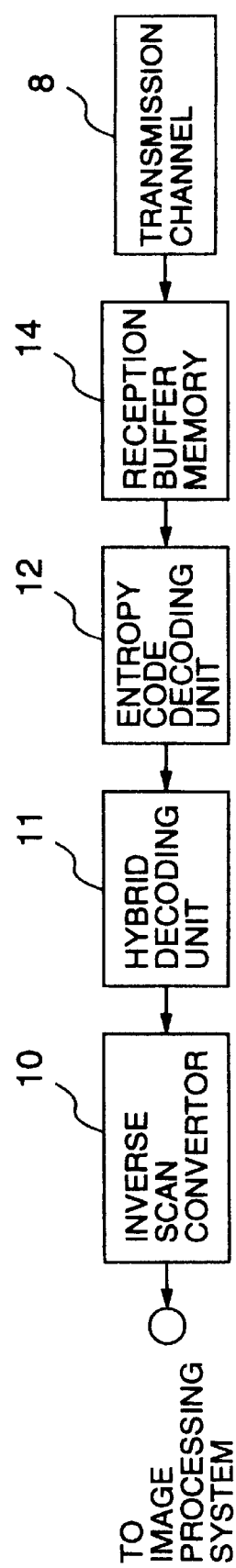
FIG. 5 is a block diagram showing an exemplary receiver section of an image transmission system analyzed and studied by the inventors, and having an entropy code decoding unit and a hybrid decoding unit.

Referring first to FIG. 5 which shows an exemplary receiver section for decoding a compressed image signal, i.e., entropy-coded codes transmitted from a transmitter section as shown in FIG. 2, the receiver section is composed of a reception buffer memory (hereinafter referred to as the reception buffer) 14; an entropy code decoding unit 12; a hybrid decoding unit 11; and an inverse scan converter 10.

Codes transmitted through a transmission channel 8, for example, at a transmission rate of 1.5 Mbps are stored into the reception buffer 14 in the receiver section at a transmission timing (transmission rate) on the transmission channel 8. The stored codes are read from the reception buffer 14 at an operation clock timing used in the receiver section in the image compression/transmission system. The frequency of the operation clock is selected to be higher than the transmission rate on the transmission channel 8, for example, 13.5 MHz, such that the time base for the codes before they are inputted to the buffer 14 is converted, so that the codes after they are read from the buffer 14 are processed at a different rate. The codes read from the buffer 14 are outputted to the entropy code decoding unit 12.

The codes inputted to the entropy code decoding unit 12 are decoded therein from the entropy codes to coefficient codes which are outputted to the hybrid decoding unit 11.

The coefficient codes inputted to the hybrid decoding unit 11 are decoded therein to generate scan-converted image data which is outputted to the inverse scan converter 10.

The scan-converted image data inputted to the inverse scan converter 10 is inversely scan converted therein to generate digitized image data in an ordinary television signal format which reproduces an original image data signal inputted to the transmitter section. The image data signal can be outputted to a subsequent stage (not shown).

Figure 3:
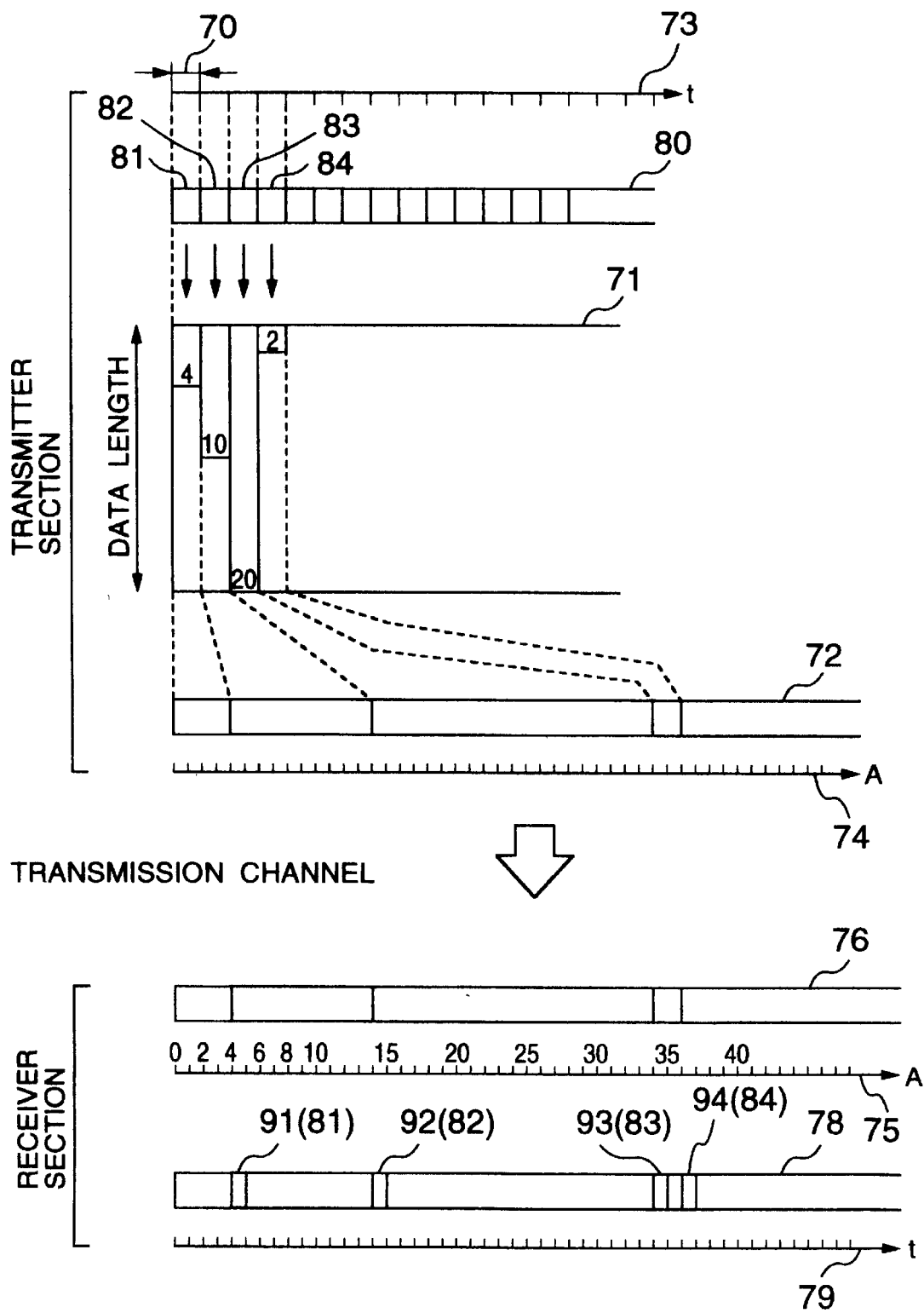
FIG. 3 is a diagram for explaining the processing for Huffman coding and decoding.

The operation of the receiver section will be next described in greater detail with reference also to FIGS. 3 and 4. Codes transmitted from the transmitter section through the transmission channel 8 shown in FIG. 2 are stored into the reception buffer 14 in the receiver section at a clock timing corresponding to the transmission rate on the transmission channel 8, for example, at a frequency of 1.5 MHz. A reception buffer code sequence 76 shown in FIG. 3 represents how the codes are stored in the reception buffer 14. A reception buffer address axis 75 is shown below the reception buffer code sequence 76 for facilitating the understanding. The reception buffer code sequence 76 is stored into the reception buffer 14 based on the reception buffer address axis 75.

More specifically, FIG. 3 shows that the writing address in the reception buffer 14 increases in order in synchronism with a clock signal at the same rate as the transmission rate on the transmission channel 8, and serially arranged codes are one by one written into the reception buffer 14 corresponding to the addresses.

Next, the codes read from the reception buffer 14 in FIG. 5 at the clock timing in the receiver section of, for example, 13.5 MHz so as to have their time base converted, are outputted to the entropy code decoding unit 12 which decodes the inputted codes by a decode table which is an inversion of the code table to the corresponding image data. The codes treated in this embodiment are assumed to be Huffman codes.

Figure 4:
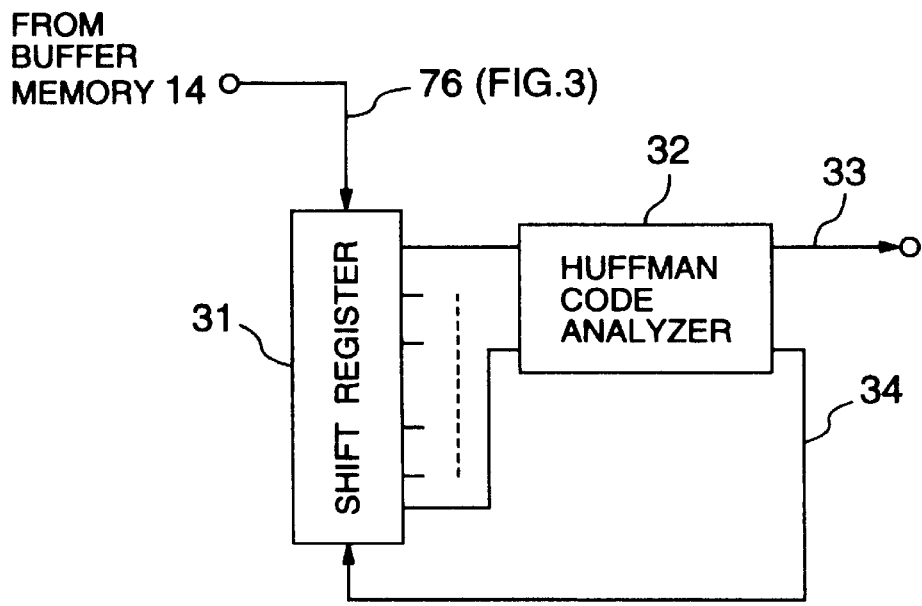
FIG. 4 is a block diagram showing a Huffman decoding unit.

A specific method of decoding Huffman codes will be next described with reference to FIG. 4 showing a block diagram of a Huffman decoder.

For decoding Huffman codes, codes arranged in the reception buffer code sequence 76 shown in FIG. 3 are read from the reception buffer 14 shown in FIG. 5, and inputted to a shift register 31 in FIG. 4. Each code in the reception buffer code sequence 76 consists of serial data. When a code is inputted to the shift register 31, its serial data bits are shifted to the last stage of the shift register 31. The code thus stored in the shift register 31 is then compared in a Huffman code analyzer 32 with a Huffman decoding table contained therein. As a result of the comparison, the Huffman code analyzer 32 outputs a decoded value in the Huffman decoding table, which matches with the code, as entropy-code-decoded data 33. The Huffman code analyzer 32 also outputs a code length of the matched code, before being decoded, as code length information 34 to the shift register 31. The shift register 31 then performs bit shifts in accordance with the code length information 34 inputted from the Huffman code analyzer 32.

In this way, the bit shifts performed by the shift register 31 enable the next code to be inputted to the shift register 31 from the beginning of the code. The next code inputted to the shift register 31 is then compared with the Huffman decoding table in the Huffman code analyzer 32. As a result of the comparison, the Huffman code analyzer 32 outputs a decoded value in the Huffman decoding table matching with the code as entropy-code-decoded data 33, and also outputs a code length of the matched code, before being decoded, to the shift register 31 as code length information 34. The shift register 31 then performs bit shifts in accordance with the code length information 34 inputted from the Huffman code analyzer 32. The Huffman decoder shown in FIG. 4 repeats these operations.

Consider a more specific example where codes which have been Huffman coded from the coefficient code sequence 80 shown in FIG. 3 are Huffman decoded. Since the first coefficient code 81 has a length of four bits, the four-bit code is shifted by four bits (four clocks are required for shifting the code by four bits) in the shift register 31 in FIG. 4. The subsequent second to fourth coefficient codes 82–84 are decoded similarly to the first coefficient code 81. Specifically, the second coefficient code 82 having a length of ten bits is shifted using ten clocks; the third coefficient code 83 having a length of 20 bits is shifted using 20 clocks; and the fourth coefficient code 84 having a length of two bits is shifted using two clocks. This processing may be represented by a decoded data sequence 78 in FIG. 3. It can be seen from the code sequence 78 that the code corresponding to the first coefficient code 81 requires four clocks to be decoded to a first decoded coefficient code 91. Likewise, codes corresponding to the second to fourth coefficient codes 82–84 require intervals of ten clocks, 20 clocks, and two clocks from the latest coefficient code generation timing to be decoded to second to fourth decoded coefficient codes 92–94, respectively. A received image processing time base 79 is shown below the decoded data sequence 78 in FIG. 3 for facilitating the understanding.

Assuming that the received image processing time base 79 shown in FIG. 3 is scaled in accordance with the processing speed of 13.5 MHz in the signal processing system (one clock has a duration of approximately 74 ns), a period of approximately 740 ns (ten clocks) is required to derive the second decoded coefficient code 92 after the first decoded coefficient code 91 has been derived. Likewise, a period of approximately 1480 ns (20 clocks) is required to derive the third decoded coefficient code 93 after the second decoded coefficient code 92 has been derived. Stated another way, the coefficient codes are inputted to the hybrid decoding unit 11 at indefinite intervals in accordance with their respective code lengths. Thus, the hybrid decoding unit 11 cannot decode a moving image at intervals of an equal number of clocks. If image data decoded by the entropy decoding unit 12 were not sent at regular intervals, it would be difficult to decode the image data in the hybrid decoding unit 11 so as to display a moving image on a display apparatus in real time in regular frame periods.

As described above, the Huffman decoder suffers from a defect associated with the nature of the Huffman decoding process that a next code cannot be decoded until one code is decoded. Therefore, in the configuration of the receiver section in the image compression/transmission system shown in FIG. 5, if codes transmitted thereto are decoded by a Huffman code decoder, coefficient codes are inputted to the hybrid decoding unit at intervals varying in accordance with their respective code lengths, thus causing a problem that decoding of a moving image in real time is difficult.

Also, since the code length of Huffman codes can reach, for example, 20 bits at maximum, reading from the reception buffer and decoding processing of Huffman codes must be performed exceptionally at a speed twenty times at maximum higher than that of other processing in order for the configuration of the receiver section shown in FIG. 5 to decode a moving image in real time. Specifically, since the frequency of the clock for the decoding operation is 13.5 MHz, a clock of 270 MHz, i.e., 20 times higher than 13.5 MHz, is required. This is not practical since hardware for implementing this configuration must support high speed operations and therefore becomes expensive.

In one embodiment of the present invention, a configuration for solving these problems is provided. Specifically, Huffman-coded codes transmitted through a transmission channel are inputted to a Huffman code decoder at a transmission rate on the transmission channel for decoding the codes to coefficient codes. The decoded coefficient codes at the transmission rate are written into a reception buffer at a rate corresponding to the transmission rate, and then read therefrom at a different reading rate from the transmission rate to carry out time-base conversion. In this way, the present invention provides an image compression/transmission method and an image compression/transmission system which decode a moving image in real time, alleviate the burden of hardware in terms of high speed operations, and are implemented at a low cost.

[EMBODIMENT 1]

Figure 1:
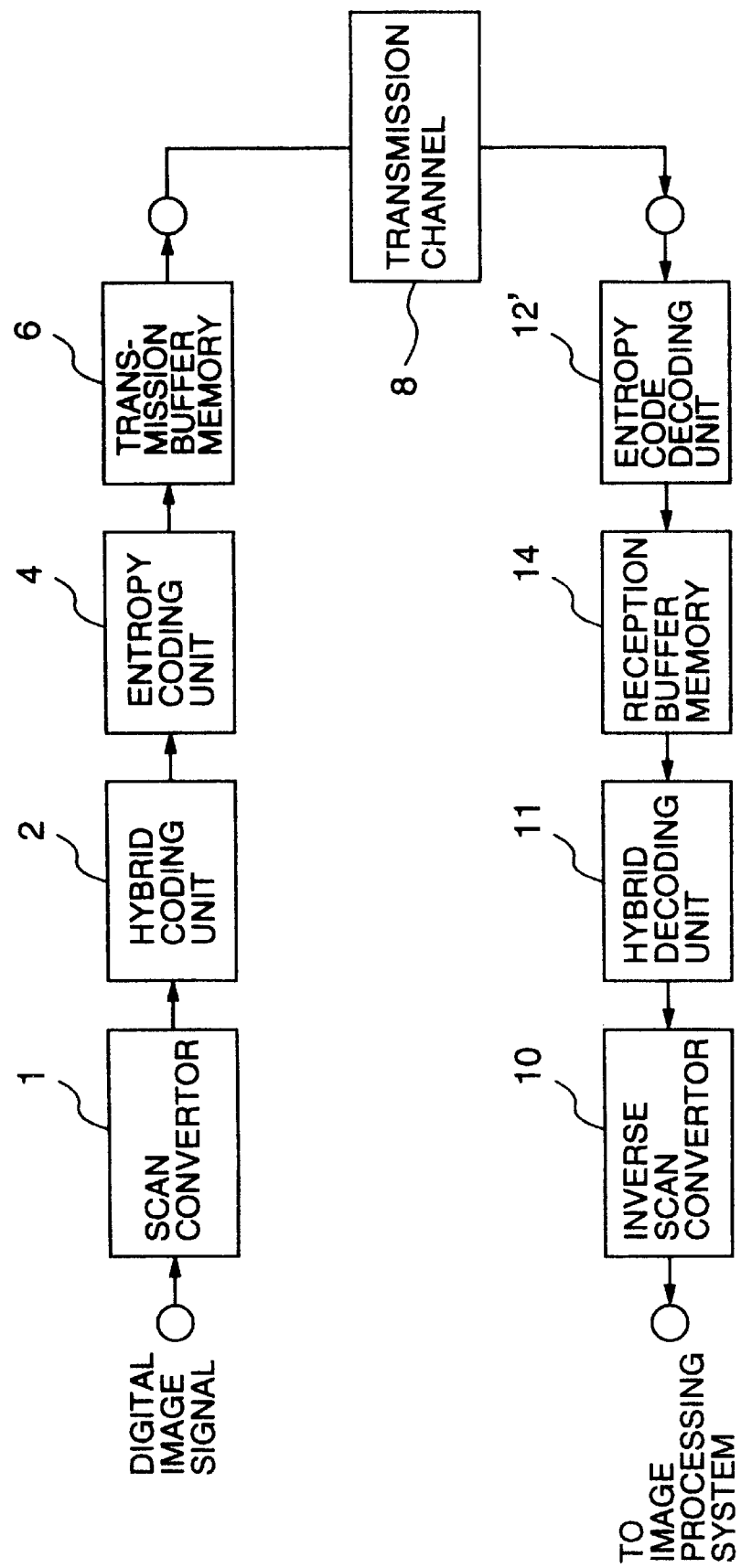
FIG. 1 is a block diagram showing an embodiment of an image transmission system according to the present invention.

A first embodiment of an image compression/transmission system according to the present invention is shown in FIG. 1, and its operation will be described below.

In FIG. 1, the system comprises a scan converter 1; a hybrid coding unit 2; an entropy coding unit 4; and a transmission buffer memory (hereinafter referred to as the transmission buffer) 6. The scan converter 1, the hybrid coding unit 2, the entropy coding unit 4, and the transmission buffer 6 constitute a transmitter section of the image compression/transmission system, wherein an image signal is processed for coding and so on by the components in above-mentioned order, and then sent from the transmitter section. Codes sent from the transmitter section are transmitted through a transmission channel 8.

The image compression/transmission system also comprises an entropy code decoding unit 12'; a reception buffer memory (hereinafter referred to the reception buffer) 14; a hybrid decoding unit 11; and an inverse scan converter 10. The entropy code decoding unit 12', the reception buffer 14, the hybrid decoding unit 11, and the inverse scan converter 10 constitute a receiver section of the image compression/transmission system. Codes transmitted from the transmitter section are processed for decoding by the components in the above-mentioned order to restore an original image signal.

The operations of the above-mentioned components will be described below in greater detail.

In the transmitter section, image data, which has been digitized from an image data signal, is inputted to the scan converter 1 which converts the image data from a scan format for normal television signals to a different scan format which facilitates the subsequent coding processing. The scan-converted image data is outputted to the hybrid coding unit 2.

The scan-converted image data is then subjected to transform coding and predictive coding in the hybrid coding unit 2, and coefficient codes derived during the transform coding and the predictive coding are outputted to the entropy coding unit 4.

The inputted coefficient codes are entropy coded in the entropy coding unit 4, and the entropy-coded codes are outputted to the transmission buffer 6.

The inputted entropy-coded codes are stored into the transmission buffer (formed, for example, of a FIFO buffer memory) 6. Then, in the transmission buffer 6, time base conversion is performed in order to send the codes to the transmission channel 8 which is operating asynchronously with the transmitter section of the image compression/transmission system, so that the codes are read out to the transmission channel 8 at a clock timing (for example, 1.5 MHz) corresponding to a transmission rate of, for example, 1.5 Mbps. It will be recognized that the operations up to this point are similar to those of the transmitter section shown in FIG. 2.

The entropy-coded codes transmitted through the transmission channel 8 are inputted to the entropy code decoding unit 12' at a rate corresponding to the transmission rate in the receiver section of FIG. 1.

The inputted entropy-coded codes are decoded from the entropy codes to coefficient codes by the entropy code decoding unit 12' at a decoding speed corresponding to the transmission rate, and the coefficient codes are outputted to the reception buffer (formed, for example, of a FIFO buffer memory) 14.

The inputted coefficient codes processed in the transmission rate are stored into the reception memory 14 at a clock timing corresponding to the transmission rate. The stored coefficient codes are then read from the reception buffer 14 at a clock timing corresponding to the operation speed in the receiver section of the image compression/transmission system, for example, at 13.5 MHz, whereby the time base is converted for the subsequent signal processing system. The time base converted coefficient codes are outputted to the hybrid decoding unit 11.

The coefficient codes inputted to the hybrid decoding unit 11 are decoded therein to generate scan-converted image data which is then outputted to the inverse scan converter 10.

The inputted scan-converted image data is inversely scan converted to generate digitized image data in the ordinary television signal format by the inverse scan converter 10, thus making it possible to restore the transmitted image signal at the same rate as the image signal rate on the transmission side.

Figure 6:
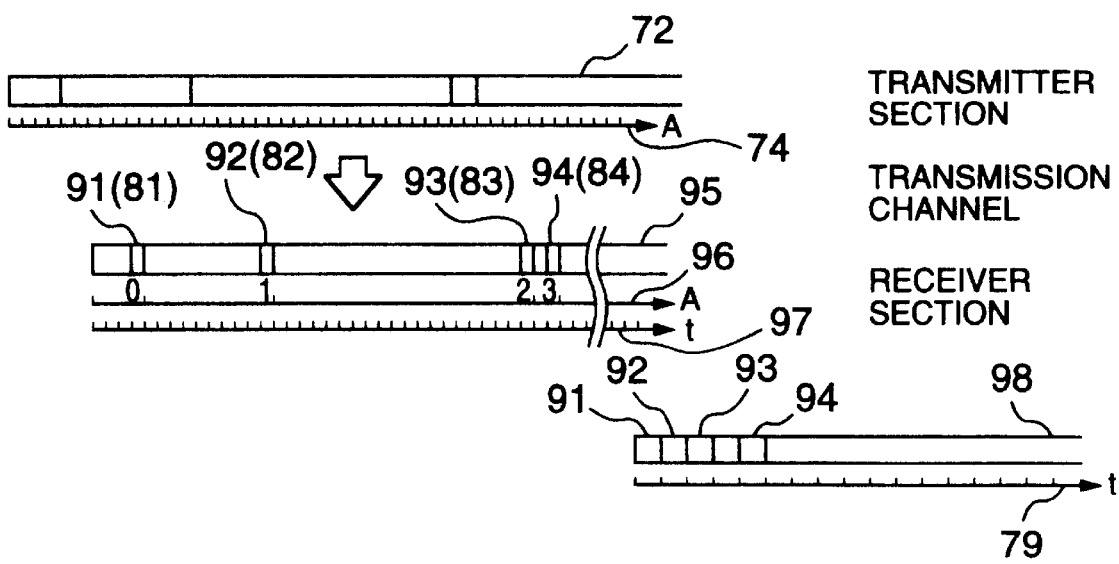
FIG. 6 is a diagram for explaining the decoding processing in an image transmission system according to an embodiment of the present invention.

Here, among the respective units constituting the image compression/transmission system according to the present invention shown in FIG. 1, operations associated with the decoding of entropy-coded codes transmitted through the transmission channel 8 at the transmission rate to coefficient codes in the entropy code decoding unit 12' and the storing of the decoded coefficient codes into the reception buffer 14 will be described in greater detail with reference to FIG. 6.

Transmitted through the transmission channel 8 shown in FIG. 1 is a transmission buffer code sequence 72 (identical to the transmission buffer code sequence 72 shown in FIG. 3) read from the transmission buffer 6 in the transmitter section at the transmission rate (1.5 Mbps). Entropy-coded codes transmitted to the receiver section at this transmission rate are inputted to an entropy code decoding unit 12' shown in FIG. 1, and decoded to coefficient codes by the entropy code decoding unit 12'.

The procedure of decoding the entropy-coded codes to the coefficient codes will be described with the aid of a transmission system time base 97 together with a reception buffer writing address axis 96 and a reception buffer coefficient code sequence 95 which are shown with the transmission system time base 97 in FIG. 6.

In the present invention, since entropy-coded codes inputted from the transmission channel 8 at the transmission rate are decoded to coefficient codes by the entropy code decoding unit 12' so that the coefficient codes are stored into the reception buffer 14, a first coefficient code corresponding to the first transmitted code is completely decoded in four clocks, counted on the transmission system time base 97, and stored into the reception buffer 14 at an address 0 indicated on the reception buffer writing address axis 96 as a first decoded coefficient code 91.

Subsequently, a second decoded coefficient code 92 is stored at an address 1 indicated on the reception buffer writing address axis 96 in ten clocks after the first decoded coefficient code 91 has been stored. Further, a third decoded coefficient code 93 is stored at an address 2 indicated on the reception buffer writing address axis 96 in 20 clocks after the second decoded coefficient code 92 has been stored.

Thus, if the contents stored in the reception buffer 14, in which the decoded coefficient codes are stored, are sequentially read therefrom in the order of the address based on a received image processing time base 79 (at 13.5 MHz), a sequence of coefficient codes are restored as shown by a coefficient code data sequence 98. In this way, even if the entropy code decoding unit 12' is used, coefficient codes can be sequentially decoded.

As described above, the reception buffer 14 shown in FIG. 5 is employed to decode codes which are transmitted at the transmission rate of the clock timing, which is essentially different from the time base for the signal processing system, based on the time base for the signal processing system. The reception buffer 14 in the embodiment of FIG. 1 has a function of absorbing variations in required time for the decoding (variations in code length), particularly occurring when entropy-coded codes are decoded to derive coefficient codes, in addition to a function of absorbing the difference in the time base between the transmission rate and the signal processing rate.

Describing the operation of this embodiment, in the receiver section, entropy-coded codes transmitted through the transmission channel are entropy code decoded at a speed corresponding to the transmission rate, and then the decoded coefficient codes are stored into the reception buffer. In the reception buffer, the time base is converted such that the coefficient codes stored therein are read at a speed corresponding to the signal processing rate in the subsequent signal processing system, so that the coefficient codes can be outputted from the reception buffer to the next stage in real time at equal clock intervals without temporal variations which may occur during the entropy code decoding.

[EMBODIMENT 2]

Figure 7:
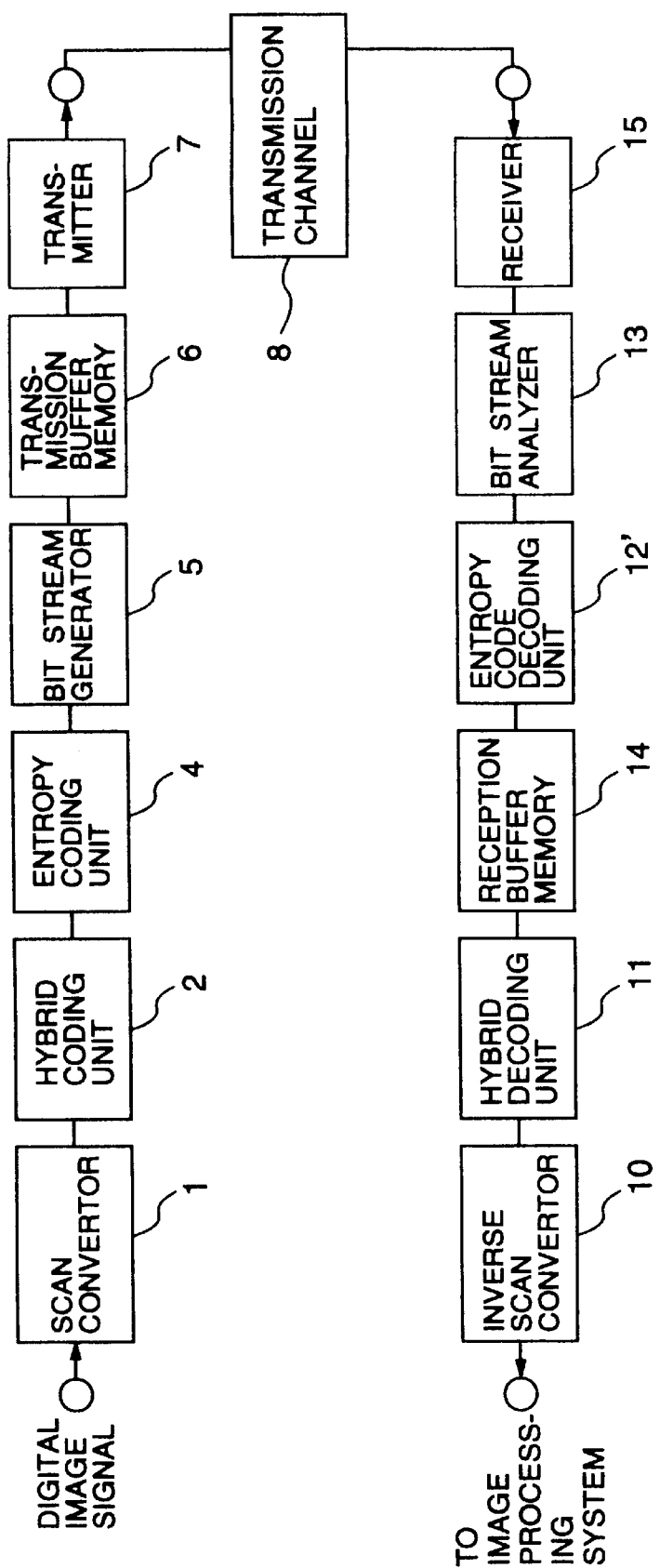
FIG. 7 is a block diagram showing another embodiment of an image transmission system according to the present invention.

A second embodiment of the image compression/transmission system according to the present invention is shown in FIG. 7, and its operation will be described below. Elements in FIG. 7 identical to those in FIG. 1 are designated with the same reference numerals.

In FIG. 7, the image compression/transmission system consists of a transmitter section and a receiver section. The transmitter section includes a scan converter 1; a hybrid coding unit 2; an entropy coding unit 4; a bit stream generator 5; a transmission buffer 6; and a transmitter 7. Codes sent from the transmitter section are transmitted through a transmission channel 8.

The receiver section, on the other hand, includes a receiver 15; a bit stream analyzer 13; an entropy code decoding unit 12'; a reception buffer 14; a hybrid decoding unit 11; and an inverse scan converter 10.

In the transmitter section, image data, which is a digitized image data signal, is inputted to the scan converter 1 for scan conversion. The scan-converted image data is inputted to the hybrid coding unit 2 which performs transform coding and predictive coding on the scan-converted image data.

Coefficient codes derived by the transform coding and the predictive coding in the hybrid coding unit 2 are inputted to the entropy coding unit 4 in which the coefficient codes are entropy coded.

Next, the entropy-coded codes are inputted to the bit stream generator 5 in which coding mode information, an error correcting code, a speech signal, and so on are added to the entropy-coded codes.

The entropy-coded codes with the error correcting code and so on added thereto are stored into the transmission buffer 6. The codes stored in the transmission buffer 6 are transmitted by the transmitter 7 through the transmission channel 8.

The codes transmitted through the transmission channel 8 are received by the receiver 15 in the receiver section. The entropy-coded codes with the error correcting code and so on added thereto are inputted to the bit stream analyzer 13 which analyzes the coding mode information, the error correcting code which is used to correct transmission errors, and so on at a speed corresponding to the transmission rate. An entropy-coded code portion within the transmitted codes is inputted to the entropy code decoding unit 12' which decodes the code portion to coefficient codes at a speed corresponding to the transmission rate.

The coefficient codes decoded at the transmission rate are stored into the reception buffer 14, and read therefrom at a clock timing for the signal processing system in the receiver section, whereby the time base is converted. The coefficient codes read from the reception buffer 14 are inputted to the hybrid decoding unit 11. Scan-converted image data decoded by the hybrid decoding unit 11 is inputted to the inverse scan converter 10 wherein the scan-converted image data is subjected to inverse scan conversion to generate image data in the normal television signal format from which the transmitted image signal can be restored.

In the receiver section, the entropy-coded codes with the error correcting code and so on added thereto, after being transmitted through the transmission channel to the receiver section, are subjected to analysis with respect to the error correcting code and so on in the bit stream analyzer, and the additional data is removed. Then, the entropy-coded codes are entropy code decoded to coefficient codes which are stored into the reception buffer. The above processes are performed at a speed corresponding to the transmission rate. In the reception buffer, the time base is converted such that the coefficient codes are outputted therefrom at a speed corresponding to the signal processing rate in the subsequent signal processing system. Therefore, similarly to the first embodiment, the coefficient codes can be outputted from the reception buffer to the next stage in real time at intervals of an equal number of clocks.

This embodiment is configured to eliminate the problem occurring in the receiver section in FIG. 5, such that entropy-coded codes are decoded in the entropy code decoding unit based on the time base for the transmission system, the decoded coefficient codes are stored once into the reception buffer for converting the time base after the decoding, and the coefficient codes are read from the time base converting reception buffer to the hybrid decoding unit at the clock timing used in the subsequent signal processing system.

As a result, since the coefficient codes decoded from the entropy-coded codes are stored in the time base converting reception buffer, the coefficient codes can be read from the time base converting reception buffer connected subsequent to the entropy code decoding unit at a lower rate, and the operation speed of the hybrid decoding unit for decoding the codes can be made lower. In addition, the time base converting reception buffer eliminates the necessity for complicated control which would be otherwise required for the decoding processing in the hybrid decoding unit due to varying lengths of respective codes, thus making the configuration of the hardware simple.

Also, since the hybrid coding unit need not consider variations in time required for the decoding due to indefinite lengths of codes as mentioned above, a moving image can be decoded in real time on the condition that $n \geq m$ is satisfied, where n is an integer number for expressing the ratio of the amount of original image data to the amount of compressed image data as $1:1/n$, and m is an integer number for expressing the ratio of the operation clock rate in the signal processing system to the clock rate in the transmission system as $1:1/m$. For example, when the data compression ratio is 1/5, i.e., n=5, the transmission rate on the transmission channel may be one fifth or less of the operation speed in the signal processing system ($m \leq 5$).

In the configuration of the receiver section shown in FIG. 5, the entropy code decoding processing must be performed at a clock rate in the image processing system connected subsequent to the receiver section, for example, at 13.5 MHz. However, in the configurations of the receiver sections according to the embodiments shown in FIGS. 1 and 7, the entropy code decoding processing can be performed at the transmission rate on the transmission channel. Generally, in transmission of compressed data, a transmission rate on a transmission channel is lower than a clock rate in an image processing system. For example, with the transmission rate at 1.5 Mbps, the entropy decoding processing can be performed at a clock rate of 1.5 MHz, so that relatively slow devices may be used for logic circuits constituting the entropy code decoding unit, and accordingly the entropy code decoding unit can be manufactured at a lower cost.

Further, for processing a high resolution image having a number of pixels more than that currently stipulated by ITU-R Recommendation 723, the clock rate in the image processing system may be 20–30 MHz or more. Even in such a case, the entropy coding processing can be performed at a transmission rate on the transmission channel, so that faster devices are not required for the logic circuits.

As described above, according to the present invention, Huffman-coded (entropy-coded) codes, transmitted through a transmission channel, are inputted to a Huffman (entropy) code decoding unit at a transmission rate and decoded to coefficient codes, and the decoded coefficient codes at the transmission rate are inputted to a reception buffer in which the time base is converted, such that the coefficient codes are outputted therefrom at an operation rate in a subsequent signal processing system, so that a moving image can be decoded in real time. It is also possible to provide an image compression/transmission method and an image compression/transmission system which are less costly and alleviate the burden of hardware in terms of the operation speed.

We claim:

1. An image data signal transmission system for transmitting and receiving a compressed image data signal comprising:

a scan converter for scanning a digital image signal which has been scanned in a predetermined scanning scheme in a different scanning scheme;

a hybrid coding unit for performing transform coding and predictive coding on an outputted image data signal from said scan converter and outputting the coded coefficient codes;

an entropy coding unit for converting the output from said hybrid coding unit to entropy-coded codes;

a first memory unit for storing therein said entropy-coded codes and reading said stored codes at a speed corresponding to a predetermined transmission rate;

a transmission channel for transmitting said codes read from said first memory unit at said predetermined transmission rate;

an entropy code decoding unit for entropy code decoding said entropy-coded codes transmitted through said transmission channel at a decoding speed corresponding to said predetermined transmission rate on said transmission channel to generate coefficient codes;

a second memory unit for storing therein said coefficient codes generated in said entropy code decoding unit and reading said stored coefficient codes at a speed different from said decoding speed;

a hybrid decoding unit for hybrid decoding said coefficient codes read from said second memory unit and outputting decoded data; and an inverse scan converter for scanning said decoded data from said hybrid decoding unit in a manner inverse to the scanning performed by said scan converter.

2. A system according to claim 1, further comprising:

a bit stream generator for adding a code indicative of a coding mode and an error correcting code to said entropy-coded codes outputted from said entropy coding unit and outputting said entropy-coded codes with the additional codes to said first memory unit;

a transmitter for sending said codes read from said first memory to said transmission channel;

a receiver for receiving said codes transmitted through said transmission channel; and a bit stream analyzer for analyzing said code indicative of a coding mode and said error correcting code within said codes received by said receiver.

3. A digital image data transmission system comprising:

a scan converter for scan-converting digital image data in a television signal scan format into scan-converted digital image data in a scan format different from the television signal scan format;

a hybrid coding unit for converting the scan-converted digital image data from the scan converter into coefficient codes;

an entropy coding unit for converting the coefficient codes from the hybrid coding unit into entropy-coded codes;

a first memory unit for storing the entropy-coded codes from the entropy coding unit, and outputting the stored entropy-coded codes at a speed corresponding to a transmission rate;

a transmission channel for transmitting the entropy-coded codes outputted from the first memory unit at the transmission rate;

an entropy code decoding unit for decoding the entropy-coded codes from the transmission channel into coefficient codes at a decoding speed corresponding to the transmission rate;

a second memory unit for storing the coefficient codes from the entropy code decoding unit at a writing speed equal to the decoding speed, and outputting the stored coefficient codes at a reading speed different from the writing speed;

a hybrid decoding unit for decoding the coefficient codes outputted from the second memory unit into digital image data; and an inverse scan converter for scan-converting the digital image data from the hybrid decoding unit into digital image data in a television signal scan format in a manner inverse to the scan conversion performed by the scan converter.

4. A digital image data transmission system according to claim 3, further comprising:

a bit stream generator, coupled to the entropy coding unit, for adding at least (1) a code indicative of a coding mode and (2) an error correcting code to the entropy-coded codes; and a bit stream analyzer, coupled to the transmission channel, for analyzing at least (1) the code indicative of the coding mode and (2) the error correcting code added to the entropy-coded codes.

5. A digital image data transmission system according to claim 3, wherein the hybrid coding unit, the entropy coding unit, and the first memory unit are included in a signal processing circuit operating based on an operation clock having an operation clock rate;

wherein the transmission channel transmits the entropy-coded codes outputted from the first memory unit at the transmission rate based on a clock having a clock rate;

wherein a ratio of (1) a data amount of the digital image data in a television signal scan format scan-converted by the scan converter to (2) a data amount of the entropy-coded codes from the entropy coding unit is 1:1/n, where n is an integer;

wherein a ratio of (1) the operation clock rate in the signal processing circuit to (2) the clock rate in the transmission channel is 1:1/m, where m is an integer; and wherein $n \geq m$.

* * * * *